(12) United States Patent
López García et al.

(10) Patent No.: US 9,725,613 B2
(45) Date of Patent: Aug. 8, 2017

(54) INK COMPOSITION FOR INKJET PRINTING

(71) Applicant: FUNDACIÓ EURECAT, Cerdanyola del Valles (ES)

(72) Inventors: Laura López García, Barcelona (ES); Oscar Hernán Ramírez Gutiérrez, San Sebastian de los Reyes (ES); Laia Francesch De Castro, Morlaas (FR); Salvador Borrós Gómez, Sant Cugat del Valles (ES); Núria Agulló Chaler, Valldoreix (ES); Joan Gilabert Porres, Sant Jaume d'Enveja (ES); Laia Vilar Abril, Mataro (ES)

(73) Assignee: FUNDACIÓ EURECAT, Cerdanyola del Vallès (ES)

( * ) Notice: Subject to any disclaimer, the term of this patent is extended or adjusted under 35 U.S.C. 154(b) by 0 days.

(21) Appl. No.: 14/893,233

(22) PCT Filed: Apr. 16, 2014

(86) PCT No.: PCT/ES2014/070329
§ 371 (c)(1),
(2) Date: Nov. 23, 2015

(87) PCT Pub. No.: WO2014/188029
PCT Pub. Date: Nov. 27, 2014

(65) Prior Publication Data
US 2016/0122566 A1    May 5, 2016

(30) Foreign Application Priority Data
May 24, 2013   (ES) .................................. 201330751

(51) Int. Cl.
*C09D 11/38*   (2014.01)

(52) U.S. Cl.
CPC .................................. *C09D 11/38* (2013.01)

(58) Field of Classification Search
CPC .................................................... C09D 11/30
See application file for complete search history.

(56) References Cited

U.S. PATENT DOCUMENTS

| | | | | |
|---|---|---|---|---|
| 6,593,408 B1 * | 7/2003 | Takaki | ...................... | A61K 8/11 524/414 |
| 2004/0134381 A1 * | 7/2004 | Taguchi | .................. | C09D 11/40 106/31.43 |
| 2010/0041816 A1 * | 2/2010 | Ikoshi | .................. | C09D 11/322 524/503 |

FOREIGN PATENT DOCUMENTS

| | | |
|---|---|---|
| EP | 0885940 A1 | 12/1998 |
| JP | 2001139865 A | 5/2001 |
| JP | 2004195906 A | 7/2004 |
| WO | 2010135834 A1 | 12/2010 |

OTHER PUBLICATIONS

International Search Report and the Written Opinion of the International Searching Authority for Application No. PCT/ES2014/070329, issued by the European Patent Office dated Jul. 29, 2014, 11 pages, Rjiswijk, Netherlands.
Adam B. Braunschweig et al: "Molecular printing", Nature Chemistry, vol. 1, No. 5, Jun. 28, 2009 (Jun. 28, 2009), pp. 353-358, XP055130783, ISSN: 1755-4330, DOI: 10.1038/nchem.258, London, England.
H. J. Griesser et al.: Plasma Methods for the Generation of Chemically Reactive Surfaces for Biomolecule Immobilization and Cell Colonization—A Review; Plasma Process. Polym.; vol. 3, Issue 6-7, Aug. 16, 2006, pp. 392-418, Wiley-VCH, Verlang GmbH & Co., KGaA, Weinheim, Germany.
S. Borros et al.: Functionalized, Swellable Hydrogel Layers as a Platform for Cell Studies; Advanced Functional Materials; vol. 19, Issue 8, Apr. 23, 2009, pp. 1276-1286, Wiley-VCH, Verlang GmbH & Co., KGaA, Weinheim, Germany.
R. Forch et al.: Reactions of Plasma-Polymerised Pentafluorophenyl Methacrylate with Simple Amines; Plasma Processes and Polymers; vol. 7, Issue 11, Nov. 23, 2010, pp. 915-925, Wiley-VCH, Verlang GmbH & Co., KGaA, Weinheim, Germany.

* cited by examiner

*Primary Examiner* — Bruce H Hess
*Assistant Examiner* — Sathavaram I Reddy
(74) *Attorney, Agent, or Firm* — Peter B. Scull; Hamilton, DeSanctis & Cha LLP (57) ABSTRACT

The composition of the invention comprises: (a) polyethylene glycol with a molecular weight comprised between 20000 (20 K) and 50000 (50 K), at a weight/volume concentration comprised between 0.5 and 15%; (b) a non-ionic surfactant of general formula (I) where n is comprised between 5 and 40, and said surfactant being at a volume/volume concentration comprised between 0.1% and 2.0%; and (c) one or more ingredients selected from a liquid carrier, a binder and an additive suitable for printing.
The composition of the invention is used for printing molecules of biological interest.

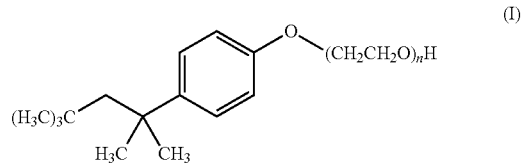

16 Claims, 2 Drawing Sheets

INK COMPOSITION FOR INKJET PRINTING

The present invention relates to inkjet printing and molecular biology. In particular, the present invention relates to a composition useful for inkjet printing molecules of biological interest, such as amino acids, peptides, and/or proteins, on a substrate.

PRIOR ART

Inkjet printing is a printing method widely used for printing texts and images on porous surfaces.

In recent years, inkjet printing technology has been applied to the field of biology, in order to develop nucleic acid or protein arrays.

The gene chips are typically generated using fountain pens with split nibs with which a droplet of diluted solution is collected and deposited on a pretreated foil, with a resolution of approximately 100 μm. Thus, the DNA binds covalently to the substrate. Robotic systems enabling a DNA library to be printed in a set of films have also been described. Additionally, conventional printers for depositing DNA on membranes at 300 dpi have been described, using a "bubble-jet" printing type, without apparent DNA degradation, to print them on glass, on a circular array of antigens on a polycarbonate CD for immunoassays and in an enzyme array on paper filters. An alternative to the depositing of oligonucleotides is the printing of reagents for the synthesis of DNA of interest, in situ, in every drop that falls on the slide. To meet the requirements of combinatorial chemistry, an inkjet printer with controlled valve that allows 48 different reagents from different tanks to be applied has been developed.

Inkjet printing technology has also been applied in the manufacture of biosensors.

The protein arrays are more problematic than those of nucleic acid as the printing and binding processes must not cause a denaturalization and loss protein's function.

There are other additional applications in tissue engineering, as well as in the modification of polymeric surfaces, which allows or prevents the cells from binding locally. Direct inkjet printing of cells in suspension has also been demonstrated.

However, as it has been stated above, one of the main limitations of using inkjet printing applied in the field of molecular biology is to prevent the denaturalization/loss of function of the component to be printed (either nucleic acid, protein, cell, etc).

Moreover, it should be taken into consideration that the compositions for printing have to meet certain parameters of viscosity and surface tension. The ink viscosity must be low enough to allow the channel through which it is injected to fill in approximately 100 μs. The surface tension, however, needs to be high enough to keep the ink in the nozzle without dripping. A key aspect in the design of an ink is the problem of "the first drop".

Therefore, despite the progress made in inkjet printing related to the field of molecular biology, there is a need to find a composition that presents suitable surface tension and viscosity parameters for use in printing, without being adversely affected the stability of the molecule to be printed or its binding to the substrate to which is applied.

DESCRIPTION OF THE INVENTION

The inventors of the present invention have developed an ink composition for use in printing, which solves the problems referred to above in the prior art.

Thus, in a first aspect the present invention provides an ink composition, comprising:

(a) polyethylene glycol with a molecular weight comprised between 20000 (20 K) and 50000 (50 K), at a concentration comprised between 0.5 and 15% weight/volume;

(b) a non-ionic surfactant of general formula (I)

(I)

where
n is comprised between 5 and 40
said surfactant being at a concentration comprised between 0.1% and 2.0% volume/volume; and

(c) one or more ingredients selected from a liquid carrier, a binder and an additive for printing.

Figure 1:
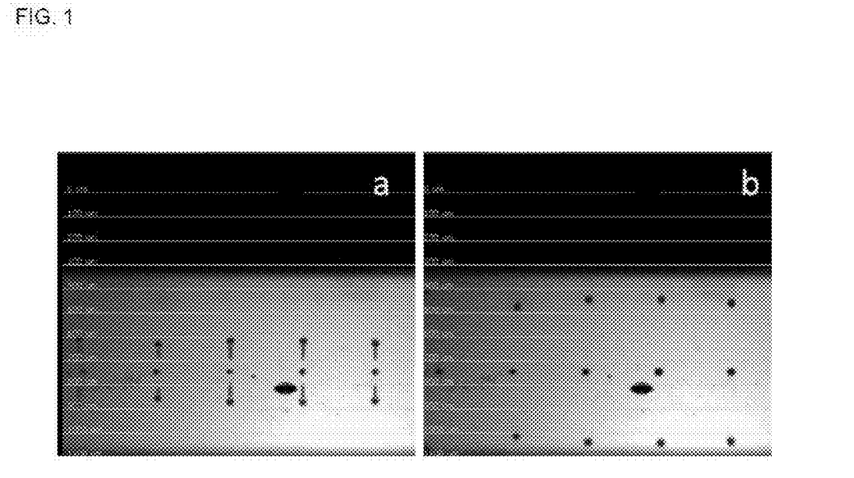
FIG. 1: behavior of the evolution of the droplets based on PEO-35 K at an ejection voltage of 25 V. The photos of the strobe images were taken 20 μsec (a) and 60 μsec (b) later.

In particular, the inventors have found that a composition including a polyethylene glycol with a molecular weight within the range between 20-50 K, within the concentration range comprised between 0.5 and 15% weight/volume, enables: (a) the viscosity to be adjusted to values of 10-13 mPa·s; (b) a homogeneous droplet to be obtained, being spherical (as shown in FIG. 1); (c) the drying kinetics of the droplet to be increased, and (d) the undesirable effects such as for example the "coffee-ring effect" to be minimized (see FIG. 1 and FIG. 2). This effect is the result of the evaporation of solvent in a drop and the displacement toward the edges of the functional material particles, giving rise to a ring instead of a homogeneous ink layer.

In an embodiment of the first aspect, the present invention provides an ink composition, comprising:

(a) polyethylene glycol with a molecular weight that is comprised between 20000 (20K) and 50000 (50K), at a concentration comprised between 0.5 and 15% weight/volume;

(b) a non-ionic surfactant of general formula (I)

(I)

where
n is comprised between 5 and 40
said surfactant being at a concentration comprised between 0.1% and 1.0% volume/volume; and (c) one or more ingredients selected from a liquid carrier, a binder and an additive suitable for printing.

In addition, the inventors of the present invention have found that including a non-ionic surfactant of formula (I) at a concentration range comprised between 0.1% and 1.0% volume/volume, the surface tension can be adjusted to approximately 35 mN/m, ideal for inkjet printing. Moreover, as shown below, when the concentration of the surfactant of general formula (I) exceeds 1% volume, the ink quality worsens, thus generating a sort of foam that hinders the proper formation of the drop for its injection through the injector hole.

Furthermore, as shown below, the effect associated with the inclusion of the non-ionic surfactant of general formula (I) is not observed with another surfactant widely used in the formulation of printing compositions, such as the Tween 80 which, for the same concentration values, provides an ink with surface tension values above 45 mN/m, i.e., outside the optimum range for inkjet printing. Therefore, if Tween 80 were used, other surfactants would be necessary included in order to reach surface tension values suitable for printing, which would make the composition preparation more expensive, and in addition, would endanger the stability as well as the effectiveness of the molecule binding, which molecule is intended to be printed, on the substrate Advantageously, with the inclusion of a non-ionic surfactant of general formula (I) it is not necessary to use other surfactants to adjust the surface tension of the composition, which means a great advance with respect to the use of the Tween 80.

As it has been disclosed above, in the field of inkjet printing of molecules of interest in the area of biology, it is crucial to achieve a composition which is, on the one hand suitable for printing, which means that it has to meet appropriate surface tension and viscosity parameters, and, on the other hand, that respects both the stability/activity of the molecule to be printed and its anchor to the substrate on which the printing of the composition of the invention takes place.

In this sense, the inventors of the present invention have found that with a composition such as the one of the first aspect, which includes PEG at a certain range of molecular weight and concentration, as well as the non-ionic surfactant of general formula (I) at a given concentration, a composition suitable for inkjet printing is obtained without the stability or the binding of the molecule to be printed on a substrate being adversely affected. In particular, the experimental data provided below illustrate how the marker, fluorescein-5-thiosemicarbazide marker (widely used in the field of biology as a marker of biomolecules in the development of biosensors), is perfectly anchored to the functionalized substrate (see FIG. 3). In addition, by using fluorescent microscopy it is possible to verify that the fluorescent activity of the marker, once printed on the substrate, is maintained without any significant degradation of its intensity (see FIG. 3). This is an indication that the composition of the invention does not adversely affect the activity of the molecule to be printed on the substrate, nor does impede or hinder its anchoring to the substrate.

Another remarkable advantage of the composition object of the present invention is that it does not generate aggregates, which provides the composition of the invention with an ideal profile to be used in printing.

For all of the above, the composition object of the present invention represents a breakthrough in inkjet printing, applied in the field of biotechnology.

In the present invention, the term "polyethylene glycol" (PEG), also known as polyethylene oxide or polyoxyethylene (POE), is a polyether formed by a monomer of formula (II):

(II)

Traditionally, the degree of polymerization is characterized by a K value, which is a function of the viscosity. The greater the polymerization value, the greater the value of K. In an embodiment, the PEG has a molecular weight between 25000 (25 K) and 50000 (50 K). In another embodiment, the PEG has a molecular weight between 20000 (20 K) and 40000 (40 K). In another embodiment, the PEG has a molecular weight selected from the group consisting of 20000 (20 K), 25000 (25 K), 35000 (35 K), and 40000 (40 K). Preferably, the molecular weight of the polyethylene glycol is 35000 (35 K)

In another embodiment, the PEG is within the weight/volume concentration range comprised between 5 and 10%. In another embodiment, the PEG is in a weight/volume concentration between 6 and 8%. In another embodiment, the PEG is in a weight/volume concentration of 7.5%.

In another embodiment, the PEG has a molecular weight of 35 K and is within the weight/volume concentration range comprised between 0.5 and 15%. In another embodiment, the PEG has a molecular weight of 35 K and is within the weight/volume concentration range comprised between 5 and 10%. In another embodiment, the PEG has a molecular weight of 35 K and is within the weight/volume concentration range comprised between 6 and 8%. Preferably, the PEG has a molecular weight of 35 K and is in a weight/volume concentration of 7.5% w/v.

In the present invention, the non-ionic surfactant of the alkyl aryl polyether alcohol type of general formula (I) is also known commercially as Triton X® (registered trademark of Union Carbide Co., Inc.). In an illustrative and non-limiting manner, examples of the Triton X series are:

| | Value of n in the compound of general formula (I) |
|---|---|
| Triton X-114 | n = 7-8 |
| Triton X-100 | n = 9-10 |
| Triton X-405 | n = 40 |

In a preferred embodiment, the non-ionic surfactant of general formula (I) is one in which n is comprised between 9 and 10 (also known commercially as Triton X-100).

In another embodiment, the non-ionic surfactant of general formula (I) is at volume/volume concentration comprised between 0.5 and 2.0% v/v. In another embodiment, the surfactant is at a concentration comprised between 0.5 and 1.5% v/v. Preferably, the non-ionic surfactant of general formula (I) is at a concentration of 1.0% v/v.

In another embodiment, the non-ionic surfactant of general formula (I) is at a volume/volume concentration comprised between 0.1 and 0.5% v/v. Preferably, the non-ionic surfactant of general formula (I) is at a v/v concentration of 0.1%.

In another embodiment, the surfactant of general formula (I) is one in which n is comprised between 9 and 10 and is at a volume/volume concentration comprised between 0.1 and 2.0%. In another embodiment, the surfactant of general formula (I) is one in which n is comprised between 9 and 10 and is at a volume/volume concentration comprised between 0.5 and 1.5%. In another embodiment, the surfactant of general formula (I) is one in which n is comprised between 9 and 10 and is at a volume/volume concentration of 1.0%.

In another embodiment, the surfactant of general formula (I) is one in which n is comprised between 9 and 10 and is at a volume/volume concentration comprised between 0.1 and 1.0%. In another embodiment, the surfactant of general formula (I) is one in which n is comprised between 9 and 10 and is at a volume/volume concentration comprised between 0.1 and 0.5%. In another embodiment, the surfactant of general formula (I) is one in which n is comprised between 9 and 10 and is at a volume/volume concentration of 0.1%.

In the present invention the expression "weight/volume % concentration (w/v %)" is calculated by dividing the grams of polyethylene glycol added relative to the total volume of composition (expressed in milliliters) and multiplying the resulting value by 100.

In the present invention the expression "volume/volume % concentration (v/v %)" is calculated by dividing the volume of non-ionic surfactant relative to the total volume of composition, both the volume of surfactant and the total volume of composition being expressed in the same units, and multiplying the resulting value by 100.

In one embodiment, the composition of the first aspect of the invention comprises PEG with a molecular weight of 35000 (35 K) and the non-ionic surfactant is one where n is comprised between 9 and 10.

In another embodiment, the composition of the first aspect of the invention comprises PEG with a molecular weight of 35 K, at a weight/volume % concentration comprised between 0.5 and 15%; and the non-ionic surfactant of general formula (I), is one where n is comprised between 9 and 10, and is at a v/v % concentration comprised between 0.1 and 2.0%.

In another embodiment, the composition of the first aspect of the invention comprises PEG with a molecular weight of 35 K, at a weight/volume % concentration comprised between 0.5 and 15%; and the non-ionic surfactant of general formula (I), is one where n is comprised between 9 and 10, and is at a v/v % concentration comprised between 0.1 and 1.0%.

In another embodiment, the composition of the first aspect of the invention comprises PEG with a molecular weight of 35 K, at a weight/volume % concentration comprised between 5 and 10%; and the non-ionic surfactant of general formula (I), is one where n is comprised between 9 and 10, and is at a volume/volume % concentration comprised between 0.1 and 2.0%.

In another embodiment, the composition of the first aspect of the invention comprises PEG with a molecular weight of 35 K, at a weight/volume % concentration comprised between 5 and 10%; and the non-ionic surfactant of general formula (I), is one where n is comprised between 9 and 10, and is at a volume/volume % concentration comprised between 0.1 and 1.0%.

In another embodiment, the composition of the first aspect of the invention comprises PEG with a molecular weight of 35 K, at a weight/volume % concentration comprised between 6 and 8%; and the non-ionic surfactant of general formula (I), is one where n is comprised between 9 and 10, and is at a volume/volume % concentration comprised between 0.1 and 2.0%.

In another embodiment, the composition of the first aspect of the invention comprises PEG with a molecular weight of 35 K, at a weight/volume % concentration comprised between 6 and 8%; and the non-ionic surfactant of general formula (I), is one where n is comprised between 9 and 10, and is at a volume/volume % concentration comprised between 0.1 and 1.0%.

In another embodiment, the composition of the first aspect of the invention comprises PEG with a molecular weight of 35 K, at a weight/volume % concentration of 7.5%; and the non-ionic surfactant of general formula (I), is one where n is comprised between 9 and 10, and is at a volume/volume % concentration comprised between 0.1 and 2.0%.

In another embodiment, the composition of the first aspect of the invention comprises PEG with a molecular weight of 35 K, at a weight/volume % concentration of 7.5%; and the non-ionic surfactant of general formula (I), is one where n is comprised between 9 and 10, and is at a volume/volume % concentration comprised between 0.1 and 1.0%.

In another embodiment, the composition of the first aspect of the invention comprises PEG with a molecular weight of 35 K, at a weight/volume % concentration comprised between 0.5 and 15%; and the non-ionic surfactant of general formula (I), is one where n is comprised between 9 and 10, and is at a v/v % concentration comprised between 0.5 and 1.5%.

In another embodiment, the composition of the first aspect of the invention comprises PEG with a molecular weight of 35 K, at a weight/volume % concentration comprised between 0.5 and 15%; and the non-ionic surfactant of general formula (I), is one where n is comprised between 9 and 10, and is at a v/v % concentration comprised between 0.1 and 0.5%.

In another embodiment, the composition of the first aspect of the invention comprises PEG with a molecular weight of 35 K, at a weight/volume % concentration comprised between 5 and 10%; and the non-ionic surfactant of general formula (I), is one where n is comprised between 9 and 10, and is at a volume/volume % concentration comprised between 0.5 and 1.5%.

In another embodiment, the composition of the first aspect of the invention comprises PEG with a molecular weight of 35 K, at a weight/volume % concentration comprised between 5 and 10%; and the non-ionic surfactant of general formula (I), is one where n is comprised between 9 and 10, and is at a volume/volume % concentration comprised between 0.1 and 0.5%.

In another embodiment, the composition of the first aspect of the invention comprises PEG with a molecular weight of 35 K, at a weight/volume % concentration comprised between 6 and 8%; and the non-ionic surfactant of general formula (I), is one where n is comprised between 9 and 10, and is at a volume/volume % concentration comprised between 0.5 and 1.5%.

In another embodiment, the composition of the first aspect of the invention comprises PEG with a molecular weight of 35 K, at a weight/volume % concentration comprised between 6 and 8%; and the non-ionic surfactant of general formula (I), is one where n is comprised between 9 and 10, and is at a volume/volume % concentration comprised between 0.1 and 0.5%.

In another embodiment, the composition of the first aspect of the invention comprises PEG with a molecular weight of 35 K, at a weight/volume % concentration of 7.5%; and the non-ionic surfactant of general formula (I), is one where n is comprised between 9 and 10, and is at a volume/volume % concentration comprised between 0.5 and 1.5%.

In another embodiment, the composition of the first aspect of the invention comprises PEG with a molecular weight of 35 K, at a weight/volume % concentration of 7.5%; and the non-ionic surfactant of general formula (I), is one where n is comprised between 9 and 10, and is at a volume/volume % concentration comprised between 0.1 and 0.5%.

In another embodiment, the composition of the first aspect of the invention comprises PEG with a molecular weight of 35 K, at a weight/volume % concentration comprised between 0.5 and 15%; and the non-ionic surfactant of general formula (I), is one where n is comprised between 9 and 10, and is at a volume/volume % concentration of 1.0%.

In another embodiment, the composition of the first aspect of the invention comprises PEG with a molecular weight of 35 K, at a weight/volume % concentration comprised between 0.5 and 15%; and the non-ionic surfactant of general formula (I), is one where n is comprised between 9 and 10, and is at a volume/volume % concentration of 0.1%.

In another embodiment, the composition of the first aspect of the invention comprises PEG with a molecular weight of 35 K, at a weight/volume % concentration comprised between 5 and 10%; and the non-ionic surfactant of general formula (I), is one where n is comprised between 9 and 10, and is at a volume/volume % concentration of 1.0%.

In another embodiment, the composition of the first aspect of the invention comprises PEG with a molecular weight of 35 K, at a weight/volume % concentration comprised between 5 and 10%; and the non-ionic surfactant of general formula (I), is one where n is comprised between 9 and 10, and is at a volume/volume % concentration of 0.1%.

In another embodiment, the composition of the first aspect of the invention comprises PEG with a molecular weight of 35 K, at a weight/volume % concentration comprised between 6 and 8%; and the non-ionic surfactant of general formula (I), is one where n is comprised between 9 and 10, and is at a volume/volume % concentration of 1.0%.

In another embodiment, the composition of the first aspect of the invention comprises PEG with a molecular weight of 35 K, at a weight/volume % concentration comprised between 6 and 8%; and the non-ionic surfactant of general formula (I), is one where n is comprised between 9 and 10, and is at a volume/volume % concentration of 0.1%.

In another embodiment, the composition of the first aspect of the invention comprises PEG with a molecular weight of 35 K, at a weight/volume % concentration of 7.5%; and the non-ionic surfactant of general formula (I), is one where n is comprised between 9 and 10, and is at a volume/volume % concentration of 1.0%.

In another embodiment, the composition of the first aspect of the invention comprises PEG with a molecular weight of 35 K, at a weight/volume % concentration of 7.5%; and the non-ionic surfactant of general formula (I), is one where n is comprised between 9 and 10, and is at a volume/volume % concentration of 0.1%.

In another embodiment, the composition of the first aspect of the invention is one comprising:
(a) polyethylene glycol with a molecular weight of 20000, at a weight/volume % concentration of 10%; and non-ionic surfactant of general formula (I) where n=9-10, at a volume/volume % concentration of 1.0%; or alternatively comprising:
(b) polyethylene glycol with a molecular weight of 35000, at a weight/volume % concentration of 7.5%; and non-ionic surfactant of general formula (I) where n=9-10, at a volume/volume % concentration of 1.0%, or alternatively comprising:
(c) polyethylene glycol with a molecular weight of 40000, at a weight/volume % concentration of 5%; and non-ionic surfactant of general formula (I) where n=9-10, at a volume/volume % concentration of 1.0%.

In another embodiment, the composition of the first aspect of the invention is one comprising:
(a) polyethylene glycol with a molecular weight of 20000, at a weight/volume % concentration of 10%; and non-ionic surfactant of general formula (I) where n=9-10, at a volume/volume % concentration of 0.1%; or alternatively comprising:
(b) polyethylene glycol with a molecular weight of 35000, at a weight/volume % concentration of 7.5%; and non-ionic surfactant of general formula (I) where n=9-10, at a volume/volume % concentration of 0.1%, or alternatively comprising:
(c) polyethylene glycol with a molecular weight of 40000, at a weight/volume % concentration of 5%; and non-ionic surfactant of general formula (I) where n=9-10, at a volume/volume % concentration of 0.1%.

In one embodiment, the composition of the first aspect of the invention comprises a molecule selected from the group consisting of a biomolecule, a biomolecule marker and a biomolecule-marker conjugated with a biomolecule.

In one embodiment, the composition of the first aspect of the invention comprises a biomolecule.

In another embodiment, the biomolecule is at a concentration comprised between 0.1 and 1 mg of biomolecule per ml of composition.

In the present invention, the term "biomolecule" refers to any molecule generated by a living organism such as: proteins, vitamins, nucleic acids and carbohydrates, among others. These biomolecules can be obtained isolating them from the organism that produces them or they can be synthesized on a laboratory scale by means of well-known techniques for those skilled in the art. The biomolecules referred in the present invention, can additionally be used in biosensors and in materials engineering. In one embodiment, the biomolecule is a protein. In another embodiment, the biomolecule is biotin.

In another embodiment, the composition of the first aspect of the invention comprises a biomolecule marker.

In the present invention, the term "biomolecule marker" includes any chromophore label that enables the tracking or identification of a specific biomolecule. Illustrative examples are fluorophores. Fluorescent labeling is a key element for the detection and analysis of biomolecules. Currently there is a large amount and variety of fluorophores. Among those used for labeling biomolecules are dansyl, fluorescein and rhodamine B.

In one embodiment, the biomolecule marker is a fluorophore.

When the composition of the present invention includes a fluorophore, the resulting composition can be used in the development of biosensors.

In another embodiment, the fluorophore is fluorescein. In another embodiment, said fluorescein is chemically modified with a thiosemicarbazide group.

The composition of the first aspect of the invention, together with the PEG and the non-ionic surfactant of general formula (I) includes one or more ingredients selected from a liquid carrier, a binder and an additive for printing.

In the present invention, the term "liquid carrier" means a liquid component of the composition, which determines its fluidity and drying properties. Additionally it serves to fix the molecule to the substrate.

In one embodiment, the liquid carrier is aqueous, i.e., it comprises water. In another embodiment, the liquid carrier comprises water and an organic solvent soluble in water. Examples of organic solvents soluble in water are alcohols. In another embodiment, the liquid carrier comprises water and an alcohol $C_1$-$C_{10}$. Examples of alcohols $C_1$-$C_{10}$ are: methanol, ethanol, propanol, isopropanol, isobutanol, and tert-butanol, among others. Preferably, the liquid carrier is water.

In the present invention, the term "additive for printing" means any other substance that is added to the composition of the invention in order to modify some of its properties. Those skilled in the art can chose from a large list of additives for printing, such as pH buffers, rheological modifiers and wetting agents, among others.

In the present invention, the expression "rheological modifier" means a substance capable of preventing the composition from sedimenting and the ink from splashing once printed, among others.

In one embodiment, the additive for printing is a pH buffer. In another embodiment, the pH buffer is selected from the group consisting of: Tris-HCl (hydrochloride of triethanolamine), MOPS (3-(N-Morpholino)propanesulfonic acid), MES (2-(N-morpholino)ethanesulfonic acid), TAE (tris hydroxymetil aminomethane/acetic acid/EDTA), TBE (Tris-HCl/Borate/EDTA), and PBS (alkaline phosphate buffer). Preferably, the pH buffer is an alkaline phosphate buffer.

In one embodiment, the composition of the first aspect of the invention comprises a liquid carrier and an additive for printing. In another embodiment, the composition of the first aspect of the invention comprises water (as liquid carrier) and an additive for printing. In another embodiment, the composition of the first aspect of the invention comprises a liquid carrier and a pH buffer (as additive for printing). In another embodiment, the composition of the first aspect of the invention comprises water (as liquid carrier) and a pH buffer (as additive for printing). Preferably, the composition of the first aspect of the invention comprises water (as liquid carrier) and alkaline phosphate buffer (as additive for printing).

In the present invention, "binder" means any substance that keeps the cohesion between the liquid carrier and the molecule to be printed. Illustrative and non-limitative examples of binders are polyacrylic acid, acrylic resins and polyvinylpyrrolidone.

The preparation of the composition of the first aspect of the invention can be carried out by mixing the different components (polyethylene glycol, non-ionic surfactant, a molecule of biological interest, etc) in any order.

In one embodiment, the composition of the first aspect of the invention is prepared by a process comprising: (a) dissolving the polyethylene glycol in an aqueous solution; (b) adding the non-ionic surfactant of general formula (I); and optionally, (c) adding the molecule of biological interest.

In another embodiment, the composition of the first aspect of the invention is prepared by a process comprising: (a) dissolving the polyethylene glycol in an aqueous pH buffer solution; (b) adding the non-ionic surfactant of general formula (I); and optionally, (c) adding the molecule of biological interest.

In another embodiment, the composition of the first aspect of the invention is prepared by a process comprising: (a) dissolving the polyethylene glycol in an aqueous alkaline phosphate buffer solution; (b) adding the non-ionic surfactant of general formula (I); and (c) adding the molecule of biological interest.

In a second aspect, the present invention provides the use of a composition as defined above, for inkjet printing a molecule of biological interest on a substrate, said biomolecule being selected from the group consisting of: a biomolecule, a biomolecule marker or a biomolecule conjugated with a marker.

Printers based on thermal, piezoelectric, electrostatic and acoustic technology are commonly used in inkjet printing. However, the first two are the most commonly used. Printing systems based on piezoelectric technology are favored over thermal printing because they do not require high temperatures for printing (200-300° C.) which prevents the functional material from degrading.

On the market, among the best-known commercial printers based on piezoelectric technology are Pixdro, Dimatix, Ceradrop.

The parameters considered for printing based on piezoelectric technology are: firing voltage, waveform, substrate to be printed/injection nozzle spacing, drop spacing, (drsp), and number of layers to apply.

In the present invention, the term "substrate" means any material that can be printable and that is functionalized with a group by means of which the printed molecule of interest binds. Illustrative and non-limitative examples of substrate are metal substrates (such as gold, silicon or glass substrates) modified with SAMs (self-assembled monolayers) or polymeric substrates (polystyrene (PS) or polymethylmethacrylate (PMMA)). The person skilled in the art shall decide, depending on the molecule that is to be printed, which type of functional group is the most suitable to be incorporated into the substrate so the anchoring of the molecule to the substrate takes place. By way of non-limiting illustration, when the aim is to print a molecule of amino acidic nature, the substrate can be functionalized with maleimides groups, biotin-avidin, carboxylic groups (—COOH), aldehydes (—CHO), and esters (—COOR, where the radical R is selected from a radical $C_1$-$C_{10}$ alkyl and a radical ring of 5-6 members, said members being selected from the group consisting of —C—, —CH—, —CH2-, —O—, —N—, —NH—, and —S—, this ring being an aromatic, saturated or partially saturated ring, and where, optionally, one or more members of the ring are substituted with one or more halogen radicals). In one embodiment, the ester is one where R is —$C_6H_5$ or —$C_6F_5$. Alternatively, in another embodiment, the substrate can be functionalized with pentafluorophenyl methacrylate (PFM) groups. In another embodiment, the substrate is polystyrene and is functionalized with PFM.

Procedures for carrying out the functionalization of the support with the functional group of interest are well known to those skilled in the art (see Griesser H. J. et al., "Plasma Methods for the Generation of Chemically Reactive Surfaces for Biomolecule Immobilization and Cell Colonization—A Review", *Plasma Process. Polym.*, 2006, vol. 3, p. 392-418; Borrós S. et al., "Functionalized, Swellable Hydrogel Layers as a Platform for Cell Studies", Advanced Functional Materials, 2009, vol. 19, p. 1276-1286; Förch R. "Reactions of Plasma-Polymerised Pentafluorophenyl Methacrylate with Simple Amines", Plasma Processes and Polymers, 2010, vol. 7, p. 915-925). For example, in the case of wanting to functionalize a substrate with PFM, it is possible to use "plasma graft" or "plasma polymerization" technique. In one embodiment, the substrate is PS and is functionalized with PFM produced by plasm graft or plasma polymerization.

In a third aspect, the present invention provides a substrate printed with a composition as the one defined above.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Furthermore, the present invention covers all possible combinations of particular and preferred embodiments described herein.

EXAMPLES

Protocol to Determine the Viscosity of an Ink Composition.

In order to determine the viscosity of the compositions formulated below, 450 μl of the composition were deposited on the analysis platform of a rheometer from Anton Paar. The ink to be analyzed was put into contact with a conical plate of 1 mm in diameter at a distance between the conical plate and the analysis platform of 1 mm. Thereafter a shear rate between $1·10^2$ and $1·10^5$ $s^{-1}$ was applied. In this range, the behavior of the ink is Newtonian, i.e., the viscosity of the ink is not affected by the shear force.

Protocol to Determine the Surface Tension of an Ink Composition.

In order to determine the surface tension of the compositions formulated below, a double-barreled syringe (B/BRAUN) fitted with a specially designed needle for analysis of surface tension is filled with ~50 μl of the formulated ink. The syringe is provided with a special piston that enables the formation of the droplet to be analyzed, at the tip of the needle in a controlled manner. Special software calculates the radius of curvature of the droplet through the Laplace-Young equation and determines the surface tension.

Example 1

Preparation of the Bio-Ink 1

A solution of PEG-35 K (Aldrich) at 7.5% weight/volume was prepared dissolving, in a beaker, 0.75 g of PEG-35 K in 8 ml of an aqueous dissolution of 0.01 M PBS (Sigma-Aldrich). The PEG and PBS solution was homogenized stirring it using a magnetic stirrer (400 RPM, 10 min). Afterwards, 0.01 ml of Triton X-100 (Sigma-Aldrich) were added and it was homogenized for 5 more minutes. Into the resulting solution, 60 μl of a fluorescein-5-thiosemicarbazide solution (Fluka) at 0.43 M in dimethylformamide (DMF, Sigma-Aldrich) were added. The resulting mixture was homogenized for 1 min. The resulting solution was transferred to a falcon type tube and flushed with the buffered solution of 0.01 M PBS up to 10 ml. Finally, the resulting composition was successively filtered with polyvinylidene fluoride PVDF filters of 0.45 μm and 0.2 μm in diameter.

Following the aforementioned protocols, it was found that the formulation 1 had a viscosity of 11.20±1.1 mPa·s and a surface tension of 35.53±0.3 mN/m.

Example 2

Preparation of the Bio-Ink 2

A solution of PEG-20 K (Aldrich) at 10.0% weight/volume was prepared dissolving, in a beaker, 0.100 g of PEG-20 K in 8 ml of an aqueous dissolution of 0.01 M PBS (Sigma-Aldrich). The PEG and PBS solution was homogenized stirring it using a magnetic stirrer (400 RPM, 10 min). Afterwards, 0.01 ml of Triton X-100 (Sigma-Aldrich) were added and the mixture was homogenized for 5 more minutes. Into the resulting solution, 60 μl of a fluorescein-5-thiosemicarbazide solution (Fluka) at 0.43 M in dimethylformamide (DMF) were added and the mixture was homogenized for 1 min. The resulting solution was transferred to a falcon type tube and was flushed with the 0.01 M PBS buffered solution up to 10 ml. Finally, the resulting ink was successively filtered with PVDF filters of 0.45 μm and 0.2 μm in diameter.

Following the aforementioned protocols, it was found that the formulation had a viscosity of 13.2±2.1 mPa·s and a surface tension of 35.81±0.7 mN/m.

Example 3

Preparation of the Bio-Ink 3

A solution of PEG-40 K (Aldrich) at 5.0% weight/volume was prepared dissolving, in a beaker, 0.5 g of PEG-40 K in 8 ml of an aqueous dissolution of 0.01 M PBS (Sigma-Aldrich). The PEG and PBS solution was homogenized stirring it using a magnetic stirrer (400 RPM, 10 min). Afterwards, 0.01 ml of Triton X-100 (Sigma-Aldrich) were added and the mixture was homogenized for 5 more minutes. Into the resulting solution, 60 μl of a fluorescein-5-thiosemicarbazide solution (Fluka) at 0.43 M in dimethylformamide (DMF) were added and the resulting mixture was homogenized for 1 min. The resulting solution was transferred to a falcon type tube and was flushed with the 0.01 M PBS buffered solution up to 10 ml. Finally, the resulting ink was successively filtered with PVDF filters of 0.45 μm and 0.2 μm in diameter.

Example 4

Effect of the Surfactant of Formula (I)

A. Effect of the Concentration Above 1%.

Using the bio-ink composition of example 1, the effect that an increase in the % of non-ionic surfactant had on its properties, was determined.

To this end, 2 compositions were formulated, based on the composition described in Example 1, wherein the following quantities of Triton X-100 (non-ionic surfactant of general formula (I), where n is 9-10) were incorporated: 0.15 ml and 0.20 ml in 10 ml of dissolution.

When the different compositions were homogenized, a foam formation was observed.

This phenomenon interfered adversely in the ink printing, since when its printing, in the inside of the chamber of the piezoelectric system, a considerable amount of foam, difficult to control, was generated, which resulted in the injection of bubbles. In no case was the formation of droplets possible.

Therefore, this test shows that the amount of non-ionic surfactant of general formula (I) is critical to achieve a composition suitable for injection, that leads to a homogeneous drop.

B. Effect of the Tween 80 Surfactant

In the case of Tween 80, inks as those described in examples 1 and 2 were prepared for each polyethylene glycol, replacing the Triton X-100 solution for another Tween 80 solution (Sigma-Aldrich). And varying the proportion of Tween 80 in a range from 0.1 to 1% v/v.

B.1. A solution of PEG-35 K (Aldrich) at 7.5% weight/volume was prepared dissolving, in a beaker, 0.75 g of PEG-35 K in 8 ml of an aqueous 0.01 M PBS solution (Sigma-Aldrich). The PEG and PBS solution was homogenized stirring it using a magnetic stirrer (400 RPM, 10 min). Subsequently, different amounts of Tween 80 (Sigma-Aldrich) were added in a range of 0.1-1 ml and were homogenized for 5 more minutes. Into the resulting solution, 60 µl of a of fluorescein-5-thiosemicarbazide solution (Fluka) at 0.43 M in dimethylformamide (DMF) were added. The resulting mixture was homogenized for 1 min. The resulting solution was transferred to a falcon type tube and flushed with the buffered solution of 0.01 M PBS up to 10 ml. Finally, the resulting ink was successively filtered with PVDF filters of 0.45 µm and 0.2 µm in diameter. The surface tension results are summarized in Table 1.

TABLE 1

| PEG 35K (% v) | Tween 80 (%) | S. Tension (mN/m) |
| --- | --- | --- |
| 7.5 | 0.1 | 53.03 ± 0.1 |
| 7.5 | 0.5 | 48.42 ± 0.1 |
| 7.5 | 1 | 49.43 ± 0.2 |

As it can be observed, formulations including Tween 80 showed a surface tension of approximately 40% higher than the value displayed by the bio-ink formulation 1.

B.2. A solution of PEG-20 K (Aldrich) at 10% weight/volume was prepared dissolving, in a beaker, 0.1 g of PEG-20 K in 8 ml of an aqueous solution of 0.01 M PBS (Sigma-Aldrich). The PEG and PBS solution was homogenized stirring it using a magnetic stirrer (400 RPM, 10 min). Subsequently different amounts of Tween 80 (Sigma-Aldrich) were added in a range of 0.1-1 ml and were homogenized for 5 more minutes. Into the resulting solution, 60 µl of a fluorescein-5-thiosemicarbazide solution (Fluka) at 0.43 M in dimethylformamide (DMF) were added. The resulting mixture was homogenized for 1 min. The resulting solution was transferred to a falcon type tube and flushed with the buffered solution of 0.01 M PBS up to 10 ml. Finally, the resulting ink was successively filtered with PVDF filters of 0.45 µm and 0.2 µm in diameter. The surface tension results are summarized in Table 2.

TABLE 2

| PEG 20K (% m/v) | Tween 80 (% v) | Surface T. (mN/m) |
| --- | --- | --- |
| 10 | 0.1 | 47.03 ± 0.2 |
| 10 | 0.5 | 48.66 ± 0.1 |
| 10 | ≥1 | 46.92 ± 0.2 |

As it can be observed, formulations including Tween 80 showed a surface tension at least 30% higher than the value displayed by the bio-ink formulation 2.

Therefore, the data displayed in this section show that the choice of the surfactant of general formula (I) in the v/v concentration range of 0.1-1.0%, is essential in order to adjust properly the surface tension of the ink.

Example 5

Printing of Bio-Inks

Using a syringe, a print cartridge (DMP 11610) was filled with approximately 0.5 ml of the bio-ink formulated in example 1. The piezoelectric system (which was provided with injectors of 10 ρl) was adapted and the system was allowed to rest for 2 h, the injectors remaining in a downward position. Afterwards the cartridge was placed in the holder of the printer and using a strobe camera of the DMP printer 11610, the droplets generated in the injection nozzle were observed as well as their behavior. To carry out these printing tests the pulse of the ejector nozzle and the trigger voltage were adjusted. For the nozzle pulse, the inlet time, length of stay and the outlet time of the droplet in the chamber are controlled, which are 3.584 µs, 10.688 µs and 7.29 µs respectively. The trigger voltage is adjusted to 25 V (for PEG 35 K and PEG 40 K), and 21 V (for PEG 20 K). Strobe images were taken at 20 µsec (a) and 60 µsec (b) (FIGS. 1(a) and (b))

From the results obtained, it should be highlighted that the injected droplet was homogeneous and there was no sign of coffee-ring effect. In addition, it was confirmed that the droplet, once injected, dried immediately. No formation of aggregates was observed, which provides the composition of the invention with an ideal profile to be used in printing.

Once the ideal conditions for the droplet have been established, the substrate to be printed (in this case, the substrate is PS-PFM, supplied by the group of materials engineering GEMAT, Chemical Institute of Sarrià), was placed on the printing platform and the minimum spacing between the substrate and the print cartridge was set at 1 mm. Finally, the pattern to be printed, the drop spacing and the number of layers to be printed, were defined. For printing lines, a drsp of 20 µm was chosen and two layers of bio-ink were applied. For printing dots, a drsp of 25 µm was chosen and just one single layer of bio-ink was applied.

Figure 2:
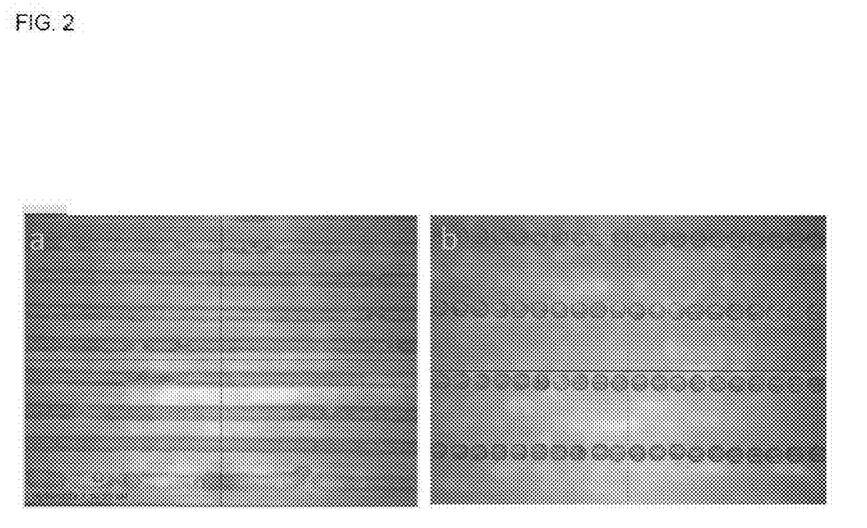
FIG. 2: Pattern generated after printing an ink formulated in example 1 using two different motifs: a) Lines drsp=20 μm and 2 layers b) dots drsp=25 μm.

In this way, horizontal lines were printed with a spacing of 20 µl between drops and applying two layers of bio-ink on the substrate, thus achieving the results shown in FIG. 2.

From the results obtained, it should be highlighted that the injected droplet was homogeneous and there was no sign of the coffee-ring effect. In addition, it was confirmed that the droplet, once injected, dried immediately.

No formation of aggregates was observed, which provides the composition of the invention with an ideal profile to be used in printing.

Figure 3:
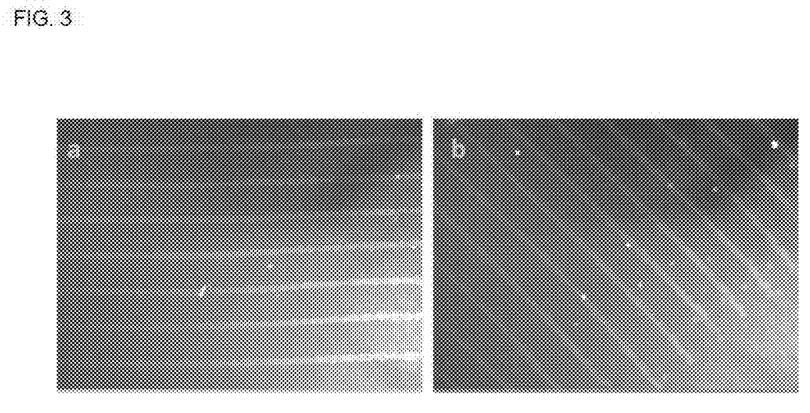
FIG. 3: fluorescence micrograph (λex=492 nm; λem=516 nm) of a pattern generated by printing the ink composition formulated in Example 1.

Finally, using fluorescence microscopy (Leika DMRA 2 equipped with a specific filter I13 for fluorochromes) within the range λ ex=492 nm; λem=516 nm, the substrates printed with the ink formulated in example 1 were analyzed, generating the images of FIG. 3.

From the results shown in FIG. 3, firstly, it should be highlighted that the fluorescent molecule is anchored to the surface of the substrate, which is an indication that the reaction between the primary amino groups of the marker and the PFM groups of the substrate has taken place, giving rise to an amide. This is an indication of the fact that the composition of the invention does not hinder the binding of the molecule of interest to the substrate and therefore the "screen effect" problem is overcome.

In FIG. 3, the high definition and resolution (40 µm) of the printed line can also be observed.

Finally, it was observed that the anchored molecule maintained its fluorescent property over a long period of time.

This is an indication that the composition of the invention does not adversely affect the stability/activity of the molecule printed.

Example 6

Preparation of the Bio-Ink 4

A solution of PEG-35 K (Aldrich) at 7.5% weight/volume was prepared dissolving, in a beaker, 0.75 g of PEG-35 K in 8 ml of an aqueous dissolution of 0.01 M PBS (Sigma-Aldrich). The PEG and PBS solution was homogenized stirring it using a magnetic stirrer (400 RPM, 10 min). Afterwards, 0.1 ml of Triton X-100 (Sigma-Aldrich) were added and the mixture was homogenized for 5 more minutes. Into the resulting solution, 60 µl of a biotin (biotinyl-3,6,9-trioxaundecanediamine, Thermo Scientific) solution at 0.042 M in PBS were added and the resulting mixture was homogenized for 1 min. The resulting solution was transferred to a falcon type tube and flushed with the buffered solution of 0.01 M PBS up to 10 ml.

Following the aforementioned protocols, it was found that the formulation 4 had a viscosity of 14.30±0.1 mPa·s and a surface tension of 36.10±0.02 mN/m.

Example 7

Preparation of the Bio-Ink 5

A solution of PEG-20 K (Aldrich) at 10% weight/volume was prepared dissolving, in a beaker, 1 g of PEG-20 K in 8 ml of an aqueous dissolution of 0.01 M PBS (Sigma-Aldrich). The PEG and PBS solution was homogenized stirring it using a magnetic stirrer (400 RPM, 10 min). Afterwards, 0.1 ml of Triton X-100 (Sigma-Aldrich) were added and the mixture was homogenized for 5 more minutes. Into the resulting solution 60 µl of a dissolution of biotin (biotinyl-3,6,9-trioxaundecanediamine, Thermo Scientific) at 0.042 M in PBS were added and the resulting mixture was homogenized for 1 min. The resulting solution was transferred to a falcon type tube and flushed with the buffered solution of 0.01 M PBS up to 10 ml.

Following the aforementioned protocols, it was found that the formulation 5 had a viscosity of 10.10±0.1 mPa·s and a surface tension of 36.45±0.05 mN/m.

Example 8

Printing with Bio-Ink 4

Using a syringe, a print cartridge (DMP 11610) was filled with approximately 0.5 ml of the bio-ink formulated in example 6. The piezoelectric system (which was provided with injectors of 10 pl) was adapted and the system was allowed to rest for 2 h, the injectors remaining in a downward position. Afterwards the cartridge was placed in the holder of the printer and using a strobe camera of the DMP printer 11610, the droplets generated in the injection nozzle were observed as well as their behavior. To carry out these printing tests the pulse of the ejector nozzle and the trigger voltage were adjusted. For the nozzle pulse, the inlet time, length of stay and the outlet time of the droplet in the chamber are controlled, which are 3.584 µs, 10.688 µs and 7.29 µs respectively. The trigger voltage is adjusted at 27 V.

From the results obtained, it should be highlighted that the injected droplet was homogeneous and there was no sign of the coffee-ring effect. In addition, it was verified that the droplet, once injected, dried immediately. No formation of aggregates was observed, which provides the composition of the invention with an ideal profile to be used in printing.

Once the ideal conditions for the droplet have been established, the substrate to be printed (in this case, the substrate is PS-PFM, supplied by the group of materials engineering GEMAT, Chemical Institute of Sarrià), was placed on the printing platform and the minimum spacing between the substrate and the print cartridge was set at 1 mm. Finally, the pattern to be printed, the drop spacing and the number of layers to be printed, were defined. For printing lines, a drsp of 20 µm was chosen.

In this way, horizontal lines were printed with a drop spacing of 20 µl.

From the results obtained, it should be highlighted that the injected droplet was homogeneous and there was no sign of the coffee-ring effect. In addition, it was verified that the droplet, once injected, dried immediately.

No formation of aggregates was observed, which provides the composition of the invention with an ideal profile to be used in printing.

Once the bio-ink of example 6 was printed, the substrates were incubated in 20 µl of Streptavidin solution (FITC, Invitrogen) for 1 minute and then cleaned with a solution of 0.01 M PBS (Sigma Aldrich) and dried with a flow of nitrogen.

Figure 4:
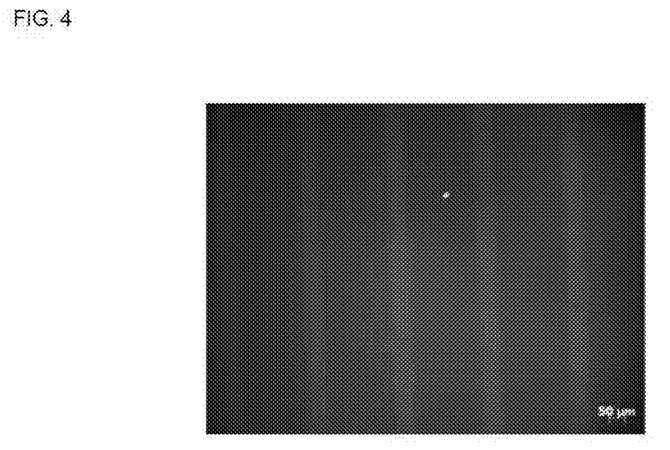
FIG. 4: fluorescence micrograph (λex=492 nm; λem=516 nm) of a pattern generated by printing the ink composition formulated in Example 6.

Finally, using fluorescence microscopy, Leika DMRA 2, equipped with a I13 specific filter for fluorochromes within the range λex=492 nm; λem=516 nm, the substrates printed with the ink formulated in example 6 were analyzed, generating the images of FIG. 4.

From the results shown in FIG. 4, firstly, it should be highlighted that the molecule is anchored to the surface of the substrate, which is an indication that the reaction between the primary amino groups of the marker and the PFM groups of the substrate has taken place, giving rise to an amide. This is an indication of the fact that the composition of the invention does not hinder the binding of the molecule of interest to the substrate and therefore the "screen effect" problem has been overcome.

Example 9

Preparation of the Bio-Ink 6

A solution of PEG-35 K (Aldrich) at 7.5% weight/volume was prepared dissolving, in a beaker, 0.75 g of PEG-35 K in 8 ml of an aqueous dissolution of 0.01 M PBS (Sigma-Aldrich). The PEG and PBS solution was homogenized stirring it using a magnetic stirrer (400 RPM, 10 min). Afterwards, 0.1 ml of Triton X-100 (Sigma-Aldrich) were added and it was homogenized for 5 more minutes. Into the resulting solution, 60 µl of a fluorescein-5-thiosemicarbazide solution (Fluka) at 0.43 M in dimethylformamide (DMF, Sigma-Aldrich) were added. The resulting mixture was homogenized for 1 min. The resulting solution was transferred to a falcon type tube and flushed with the buffered solution of 0.01 M PBS up to 10 ml. Finally, the resulting composition was successively filtered with polyvinylidene difluoride PVDF filters of 0.45 µm and 0.2 µm in diameter.

Following the aforementioned protocols, it was found that the formulation 6 had viscosity and surface tension values, which were suitable for its use in inkjet printing.

Example 10

Preparation of the Bio-Ink 7

A solution of PEG-20 K (Aldrich) at 10.0% weight/volume was prepared dissolving, in a beaker, 0.100 g of PEG-20K in 8 ml of an aqueous dissolution of 0.01 M PBS (Sigma-Aldrich). The PEG and PBS solution was homogenized stirring it using a magnetic stirrer (400 RPM, 10 min). Afterwards, 0.1 ml of Triton X-100 (Sigma-Aldrich) were added and the mixture was homogenized for 5 more minutes. Into the resulting solution, 60 µl of a fluorescein-5-thiosemicarbazide solution (Fluka) at 0.43 M in dimethylformamide (DMF) were added and the mixture was homogenized for 1 min. The resulting solution was transferred to a falcon type tube and was flushed with the 0.01 M PBS buffered solution up to 10 ml. Finally, the resulting ink was successively filtered with PVDF filters of 0.45 µm and 0.2 µm in diameter.

Following the aforementioned protocols, it was found that the formulation 7 had a viscosity of 11.9 mPa·s and a surface tension of 36.70 mN/m.

Example 11

Preparation of the Bio-Ink 8

A solution of PEG-40 K (Aldrich) at 5.0% weight/volume was prepared dissolving, in a beaker, 0.5 g of PEG-40 K in 8 ml of an aqueous dissolution of 0.01 M PBS (Sigma-Aldrich). The PEG and PBS solution was homogenized stirring it using a magnetic stirrer (400 RPM, 10 min). Afterwards, 0.1 ml of Triton X-100 (Sigma-Aldrich) were added and the mixture was homogenized for 5 more minutes. Into the resulting solution, 60 µl of a fluorescein-5-thiosemicarbazide solution (Fluka) at 0.43 M in dimethylformamide (DMF) were added and the resulting mixture was homogenized for 1 min. The resulting solution was transferred to a falcon type tube and was flushed with the 0.01 M PBS buffered solution up to 10 ml. Finally, the resulting ink was successively filtered with PVDF filters of 0.45 µm and 0.2 µm in diameter.

Following the aforementioned protocols, it was found that the formulation 8 had viscosity and surface tension values, which were ideal for inkjet printing.

The invention claimed is:

1. A composition for inkjet printing, wherein the composition comprises:
   (a) polyethylene glycol with a molecular weight that is of from 20000 to 50000, at a weight/volume concentration between 0.5 and 15%;
   (b) a non-ionic surfactant of general formula (I)

where
   n is of from 5 to 40,
   said non-ionic surfactant being at a volume/volume concentration of from 0.1% to 2.0%;

(c) one or more ingredients selected from a liquid carrier, a binder and an additive; and
   (d) a molecule selected from: a biomolecule, a biomolecule marker and a biomolecule conjugated with a marker.

2. A composition according to claim 1, wherein the v/v concentration of the non-ionic surfactant is of from 0.1 to 1.0%.

3. A composition according to claim 1, wherein the weight/volume concentration of the polyethylene glycol is of from 6 to 8%.

4. A composition according to claim 1, wherein the polyethylene glycol has a molecular weight of 35,000 (35 K) and the weight/volume concentration is of from 6 to 8%.

5. A composition according to claim 1, wherein the non-ionic surfactant of general formula (I) is one in which n has a value of from 9 to 10.

6. A composition according to claim 2 wherein the non-ionic surfactant of general formula (I) is one in which n has a value of from 9 to 10.

7. A composition according to claim 5, wherein the non-ionic surfactant of general formula (I) is at a volume/volume concentration of 1.0% or 0.1%.

8. A composition according to claim 6, wherein the non-ionic surfactant of general formula (I) is at a volume/volume concentration of 1.0% or 0.1%.

9. A composition according to claim 1, comprising at least one of:
   (a) polyethylene glycol with a molecular weight of 20000, at a weight/volume % concentration of 10%; and non-ionic surfactant of general formula (I) where n=9-10, at a volume/volume % concentration of 0.1 or 1.0%; or
   (b) polyethylene glycol with a molecular weight of 35000, at a weight/volume % concentration of 7.5%; and non-ionic surfactant of general formula (I) where n=9-10, at a volume/volume % concentration of 0.1 or 1.0%; or
   (c) polyethylene glycol with a molecular weight of 40000, at a weight/volume % concentration of 5%; and non-ionic surfactant of general formula (I) where n=9-10, at a volume/volume % concentration of 0.1 or 1.0%.

10. A composition according to claim 1, which comprises a liquid carrier and an additive.

11. A composition according to claim 10, wherein the additive is a pH buffer.

12. A composition according to claim 11, wherein the pH buffer is an alkaline phosphate buffer.

13. A composition according to claim 10, wherein the liquid carrier is water.

14. A composition according to claim 3, wherein the polyethylene glycol has a molecular weight of 35,000%.

15. A method of using the composition as defined in claim 1, the method comprising inkjet printing the composition of claim 1 onto a substrate.

16. Substrate printed with the composition as defined in claim 1.

* * * * *